US 6,615,488 B2

(12) United States Patent
Anders et al.

(10) Patent No.: US 6,615,488 B2
(45) Date of Patent: Sep. 9, 2003

(54) METHOD OF FORMING HEAT EXCHANGER TUBE

(75) Inventors: James Anders, Williamsville, NY (US); Henry Earl Beamer, Middleport, NY (US); Gerald A. Machajewski, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/066,995

(22) Filed: Feb. 4, 2002

(65) Prior Publication Data
US 2003/0145465 A1 Aug. 7, 2003

(51) Int. Cl.[7] .............................................. B23D 15/26
(52) U.S. Cl. .............................. 29/890.053; 29/890.054
(58) Field of Search ..................... 29/890.053, 890.054; 228/144, 146, 149, 150, 151, 173.1, 173.4, 173.6, 208, 214, 223, 224; 165/177, 183

(56) References Cited

U.S. PATENT DOCUMENTS

| 5,579,837 A | * 12/1996 | Yu et al. ..................... 165/183 |
| 5,692,300 A | 12/1997 | Conn et al. ............. 29/890.053 |
| 5,890,288 A | * 4/1999 | Rhodes et al. .......... 29/890.053 |
| 6,000,461 A | 12/1999 | Ross et al. .................... 165/79 |
| 6,119,341 A | * 9/2000 | Kato et al. ............. 29/890.053 |
| 6,129,147 A | * 10/2000 | Dumetz et al. ............. 165/177 |
| 6,209,202 B1 | * 4/2001 | Rhodes et al. .......... 29/890.053 |
| 6,494,254 B2 | * 12/2002 | Laveran ....................... 165/133 |
| 2001/0045277 A1 | * 11/2001 | Shinhama et al. .......... 165/177 |

FOREIGN PATENT DOCUMENTS

| EP | 0302232 | 10/1991 |
| EP | 982095 | 3/2000 |

* cited by examiner

Primary Examiner—I Cuda-Rosenbaum
(74) Attorney, Agent, or Firm—Patrick M. Griffin

(57) ABSTRACT

An improved method for producing a basic B tube configuration for a folded heat exchanger tube (26). A braze clad metal strip (10) having inner (1) and outer (0) surfaces and a opposed edges (12) is progressively formed over and in by a series of progressive roller stations (14A, 16A–14J, 16J) until the lower edges (12) on a pair of central abutting flanges 18 centrally engage the strip inner surface (1). Between two of the roller stations (G and H), a powered dispense valve (20) with nozzle (22) continuously dispenses a bead (24) of material containing flux or, alternatively, flux and braze material. Bead (24), rather than being a thin stripe, is a thick semi cylindrical shape, with substantial viscosity. As the flanges (18) move into abutment and the downstream roller stations, the flange edges (12) are forced down into the bead (24), some of which is pumped up between the outer surfaces (0) of the abutted flanges (18), yielding a good, solid braze joint between the two.

4 Claims, 6 Drawing Sheets

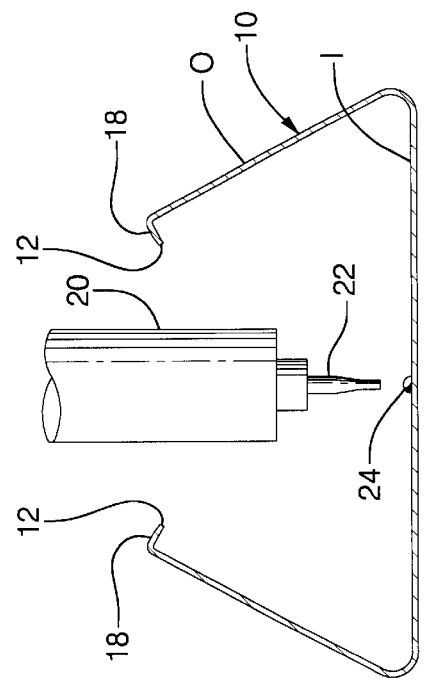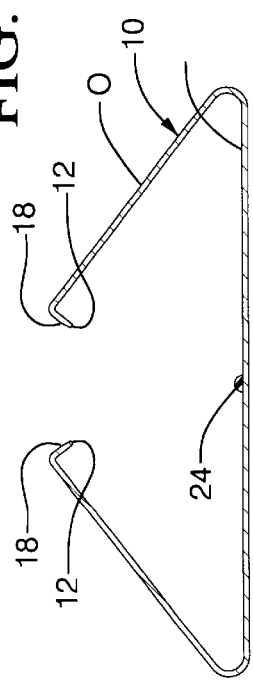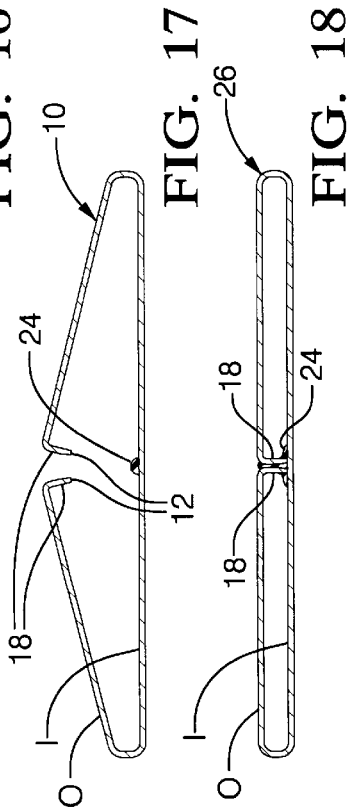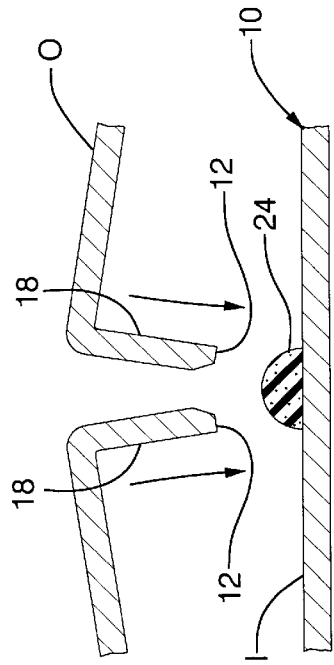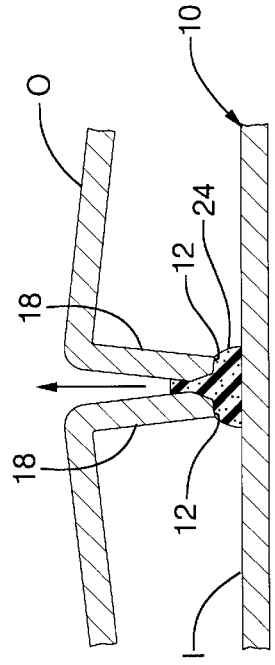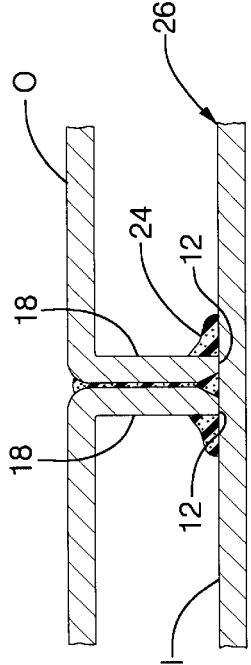

METHOD OF FORMING HEAT EXCHANGER TUBE

TECHNICAL FIELD

This invention relates to heat exchangers in general, and specifically to an improved method of forming a fabricated heat exchanger tube.

BACKGROUND OF THE INVENTION

Cross flow heat exchangers, of a type used in automotive applications and elsewhere, include a regularly spaced series of generally straight, flat and parallel tubes, through which a first fluid (such as refrigerant or engine coolant) flows in one direction, and over which a second fluid (typically ambient air) flows in another direction. Thin, corrugated air fins or air centers are brazed between the flat, parallel tube outer surfaces. In high pressure heat exchangers, such as condensers, a solid, extruded tube is often preferred, because of the inherent ability of integrally extruded structural webs to support the internal tube pressure. In lower pressure heat exchangers, such as engine cooling radiators, internal webs are not as necessary, and fabricated or folded tubes made from aluminum strip are typical. Sheet metal strip has the advantage over solid extruded material of being easier to coat with a clad layer of braze material, which melts and provides the raw material needed to create solid joints at the various component interfaces in the heat exchanger core. Even though internal pressure support is not as necessary with a low pressure tube, central structural support can be beneficial if the tube is widened, since widening makes the tube more vulnerable to outward bulging, even with fairly low pressure inside the tube. Some radiator designs use double tube rows in order to achieve sufficient coolant fluid capacity, and it would be beneficial to replace the double row with a double wide single tube.

In order to achieve sufficient structural strength in a wide fabricated tube, several basic prior art designs have been used, all of which are variations, sometimes very minor variations, on the same basic theme. The basic objective is to fold the strip over and in on itself in some fashion to provide an internal strengthening wall. Typically, the internal strengthening wall is a central (or nearly central) abutment of two flanges, welded or brazed together. One variation folds the sheet down the middle, with each section folded over into a right angle flange and then folded again toward the other until the flanges abut at the center to create a "B" shaped cross section. The abutting flanges may be welded or brazed together by any desired joining method. An example may be seen in UK Patent Specification 1,149,923. Another basic variation folds the sheet down the middle, but with each section folding in opposite directions so that the flanges each abut to opposite sides of a central spine, creating a "Z" shaped cross section. An example may be seen in U.S. Pat. No. 4,633,056, where the edges of each section abut to the central spine either at a sharp edge, or with a bent over, curved edge. A variation of the "Z" shape, seen in U.S. Pat. No. 2,655,181, bends each edge into an L shaped foot and abuts one L shaped foot to either side of a central spine, creating a very strong, three layered central wall. The same L shape can also obviously be used for the abutting flanges in the "B" shaped tube, providing for more contact area for brazing or welding, although requiring more sheet stock, at extra cost, for the same size tube. An example of this variation may be seen in U.S. Pat. No. 6,000,641, a patent which also recognizes an additional problem with a "B" cross section tube, which is the effect of the central seam on the brazing process, discussed in more detail below. With any tube cross section, the standard folding process in use today is a continuous series of rollers that progressively folds and forms the tube to shape, as a length of strip is fed through the rollers.

While the basic shape and cross section of essentially every possible variant of a folded, fabricated tube has been suggested or disclosed, the manufacturing methods and processes still have room for improvement, especially in the area of the welding and brazing of the seams. As part oF the brazing process, it is standard practice to apply a flux layer over the clad layer. Flux may be applied by electrostatic powder adhesion, or by slurry spray, to the interior surface of the strip, but either technique wastes flux by applying it to more surface area than just the contacting interfaces. If flux is applied after the tube is folded, it is difficult to get flux into the seam between the abutted flanges, without dipping, flooding or injection techniques that also waste flux.

One proposal to selectively apply flux to a "B" tube may be seen in published European Patent Application EP 0 982 095 A1. As disclosed there, a standard flux composition is applied continuously and indirectly to the central inner surface of a progressively forming tube, in a stripe where it will contact the edges of the abutted central flanges as they are folded down. This indirect flux application is done with a roller, to which the flux paste is continuously applied, and which in turn rolls along the tube central inner surface of the strip to leave behind a thin layer of flux. The rollers that seat the flange edges down into the flux stripe are located downstream of the flux roller. While this is a continuously acting and less wasteful application of flux, it is limited in that only a thin layer of flux may be applied, and of a fluid consistency suitable to the spreading action of the roller. An excessively viscous paste will not be fluid enough to be applicable by a roller, nor would a roller be inherently capable of applying a thick, viscous layer. While such a thin layer is well presented to the terminal edges of the abutting central flanges where they engage the inner surface of the tube, it is not as effective in reaching the much wider interface between abutting flanges themselves, which forms the central seam of the tube.

As noted above, there is another potential problem recognized in the art with the standard "B" shape tube cross section, a problem inherent in the shape and consequent effect of the central tube seam during the brazing process. U.S. Pat. No. 6,000,461 recognizes that the central seam creates a curved, converging depression in the outer surface of the tube, which can, through strong capillary action, draw or scavenge melted braze cladding away from the surface of the slotted header plates into which the tube ends are typically inserted. This jeopardizes the strength and integrity of the braze joints at the header slots. One solution is that extra thick braze cladding material could be provided on the outside of the tube, the header, or even to the fin material, but this would be expensive and not desirable. The patent noted proposes to skive out and enlarge the seam into a wide, non convergent gap, which would, so it is claimed, reduce the capillary action. Regardless of its effect on capillary action, such a widened seam would weaken the tube and subject it to debris trapping and corrosion. An extra manufacturing step such as skiving also adds cost.

Another patent, U.S. Pat. No. 6,129,147, seeks to control the shape of the seam by making an extra fold of the edge of the strip stock up between the pair of abutting flanges, which divides the gap of the seam in two, in effect. This also creates a very impractical and oddly shaped tube cross section, and tooling to actually create such an odd fold would be difficult to devise. Even so, dividing one deep seam into two seams would not solve the braze scavenging, seam capillary problem totally, since each side of the divided seam could still create some capillary action.

SUMMARY OF THE INVENTION

The subject invention provides an improved method for producing a folded tube of the type described above. A thick bead of flux and/or braze paste mixture is directly deposited on the inner surface of the strip as it is progressively folded to shape. As the integral flanges are bent inwardly and into abutment with each other, their lower edges are forced downwardly into the bead, and a layer of the thick bead material is squeezed up into the seam interface between the abutting flanges. This provides an excellent bond, with no additional steps necessary beyond the depositing of the bead material itself. The viscosity and consistency of the bead does not have to be limited or tailored to a rolling on process. Extra braze alloy can be provided in the bead to strengthen the bond and limit the scavenging action of the seam noted above, without any deleterious change to the tube cross section or any complication of its folding process.

BRIEF DESCRIPTION OF THE DRAWINGS

FIG. 15 is a cross section of the tube bent as far as the FIG. 9 position, but showing the application of the bead from the dispense nozzle;

FIG. 16 is a cross section of the bead and tube bent as far as the FIG. 11 position;

FIG. 17 is a cross section of the bead and tube bent as far as the FIG. 12 position;

FIG. 18 is a cross section of the bead and tube bent as far as the FIG. 13 position;

FIG. 19 is an enlargement of the flanges and the bead when the tube has been bent just past the FIG. 17 position;

FIG. 20 is a view like FIG. 19, when the tube has been bent enough farther that the flange edges begin entering the bead;

FIG. 21 is a view like FIG. 20, when the tube has been fully bent to complete the final profile.

DESCRIPTION OF THE PREFERRED EMBODIMENT

Figure 1:
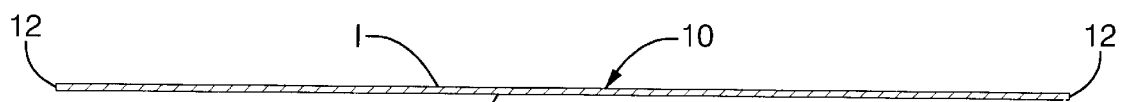
FIG. 1 is a cross section through a metal strip or tube blank prior to forming.
Figure 2:
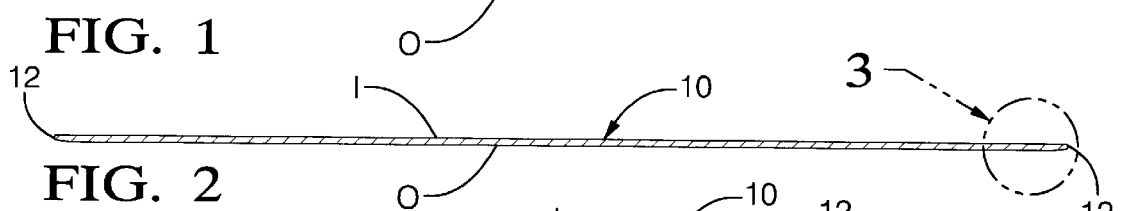
FIG. 2 shows the same strip after having the edges chamfered.
Figure 3:
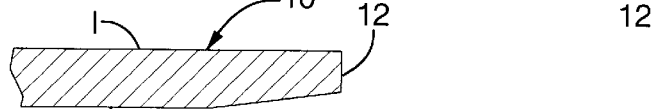
FIG. 3 is an enlargement of one edge of the strip.

Referring first to FIG. 1, the starting point of tube formation is a roll of elongated, aluminum sheet or strip, indicated generally at 10. Strip 10 would be a standard, commercially available aluminum alloy, preferably clad on at least the lower surface thereof with a standard braze alloy layer. The lower surface of the strip 10 will ultimately become the outer surface of the tube formed therefrom, and is designated "O" accordingly, while the upper surface will become the enclosed interior surface, and is designated "I". Preferably, though not necessarily, the opposed lengthwise edges 12 of strip 10 are chamfered slightly on the lower surface (the surface that will ultimately become the outer surface of the tube), as shown in FIGS. 2 and 3, either in a first step, or, alternatively, the strip 10 could be so manufactured in the first instance.

Figure 4:
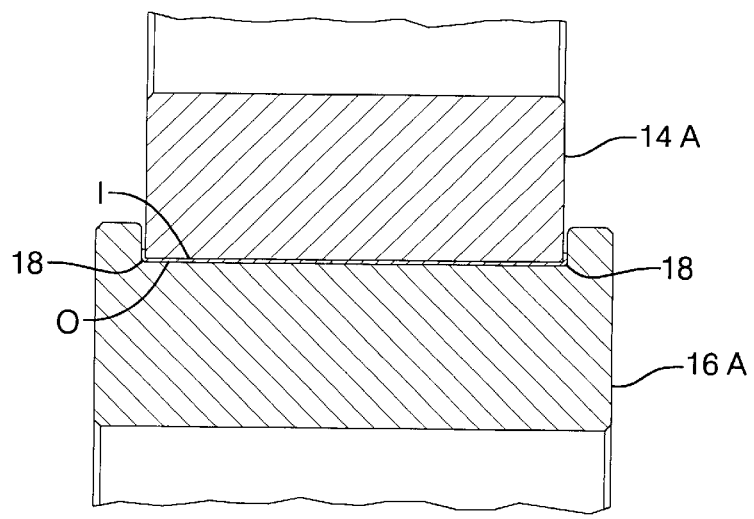
FIG. 4 is a cross section through the first set of rollers in the progressive forming line.
Figure 5:
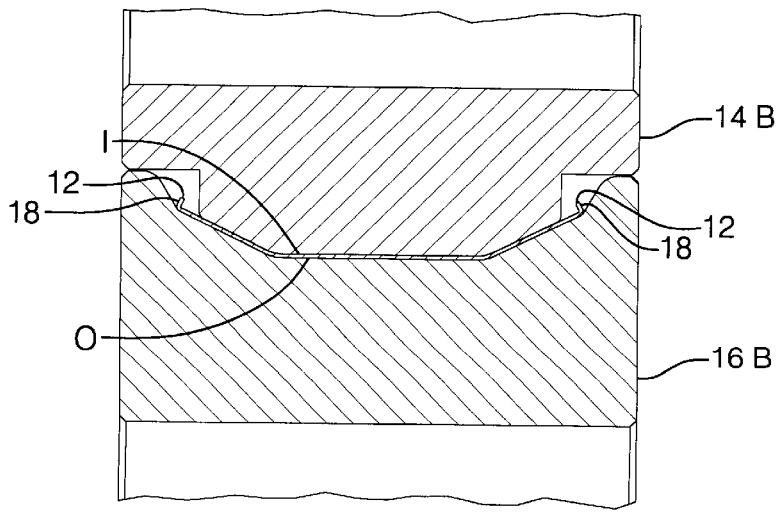
FIG. 5 is a cross section through the next set of rollers in the progressive forming line.
Figure 6:
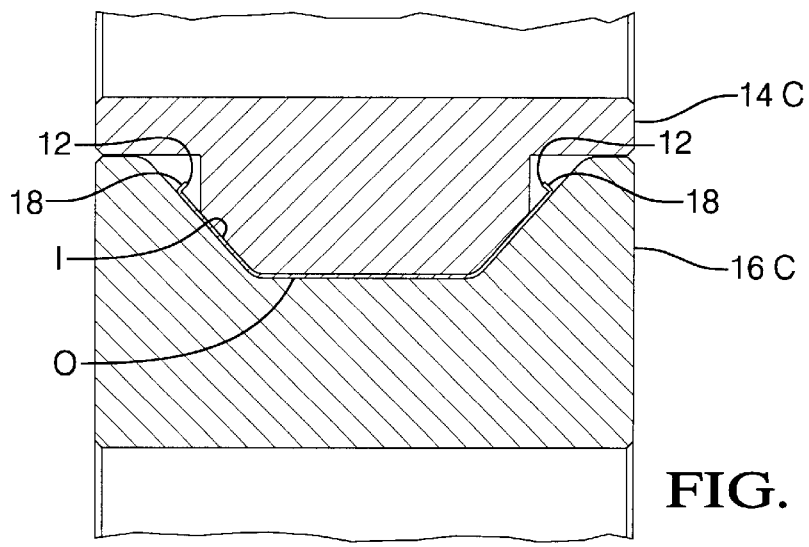
FIG. 6 is a cross section through the next set of rollers in the progressive forming line.
Figure 7:
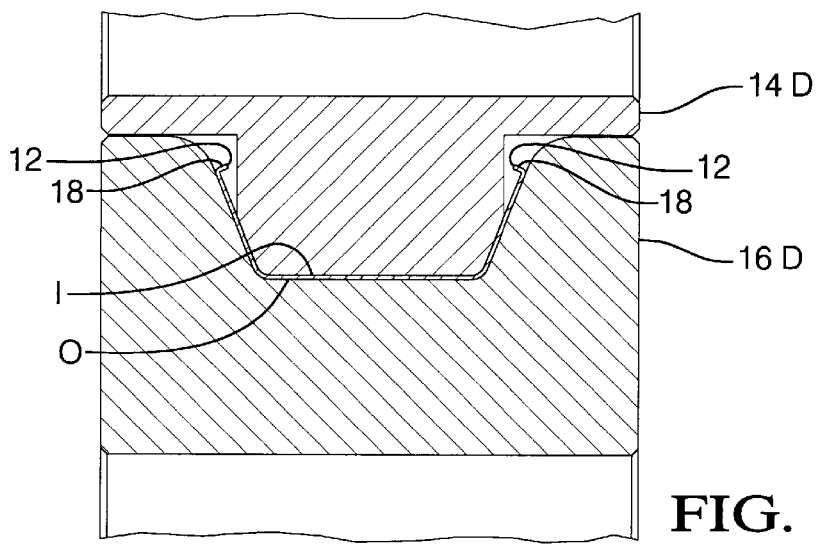
FIG. 7 is a cross section through the next set of rollers in the progressive forming line.
Figure 8:
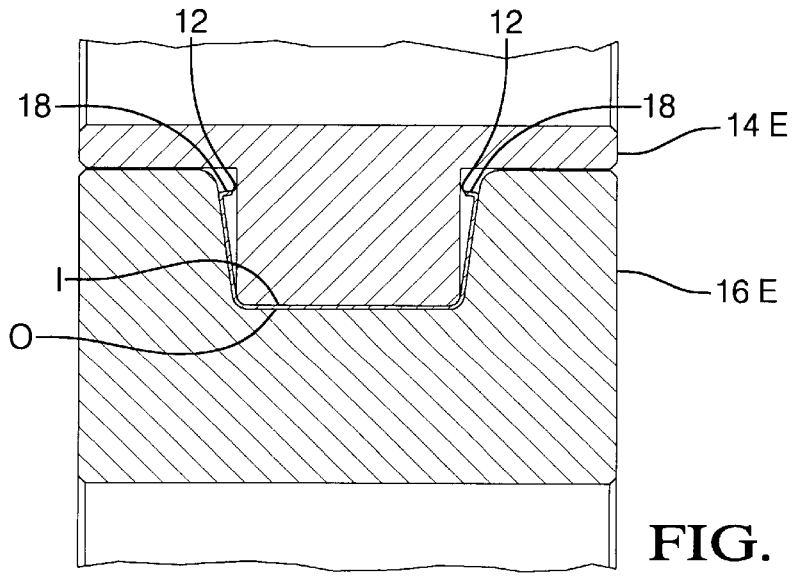
FIG. 8 is a cross section through the next set of rollers in the progressive forming line.
Figure 9:
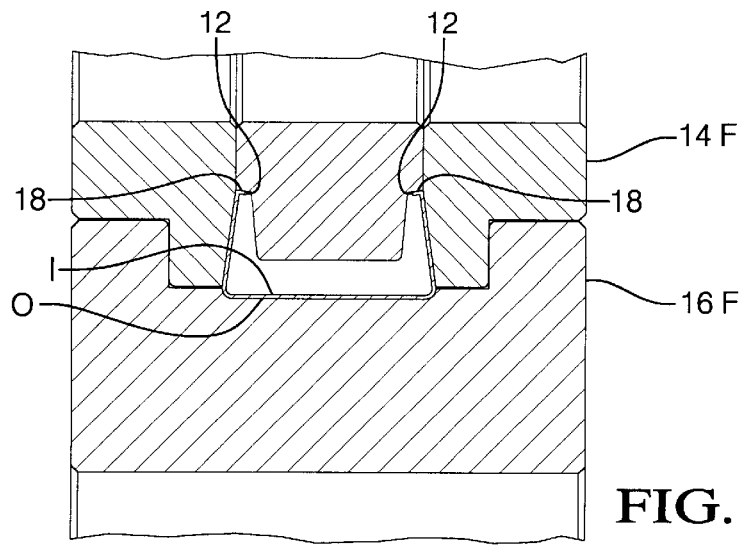
FIG. 9 is a cross section through the next set of rollers in the progressive forming line.

Referring next to FIGS. 4 through 13, a series of roller stations progressively bends the strip 10 into the final tube shape, the standard "B" cross section, which is illustrated in the absence of the bead application, for simplicity. The progressive forming and bending is standard practice, and the method of the invention here works in conjunction with this standard method, without interfering with it, while uniquely taking advantage of some of the bending and folding motions that it entails. Since the use of progressive roller stations is within the standard skill in the art of tube forming, the process and apparatus may be briefly described and summarized. A series of lower and upper rollers progressively bends and forms the strip 10, one after the other, as it is fed through. These are numbered 14A–J and 16A–J to indicate their progressive, serial action. The first step is to bend a pair of integral, substantially 90 degree flanges 18 along the opposed lengthwise sides of strip 10, as shown in FIG. 4, these being the fundamental constituents of any B type tube. The chamfered edges 12, if initially produced, would reside on the lower edge of the outer surface O of each such 90 degree flange 18. The rest of the roller stations are shaped so as to continue to bend the strip 10 progressively inwardly and downwardly. Ultimately, the flanges 18 are folded down and into abutment, to concurrently bring their edges 12, chamfered or not, into firm, close contact with the interior surface I of the folded strip 10, thereby enclosing an interior space. This final folding action is shown occurring in FIGS. 12 and 13. Alternatively, the edges 12, rather than being made initially either sharp of chamfered, could be first folded inwardly themselves, with curved or flat "feet" as shown in U.S. Pat. No. 2,655,181 referred to above. In such case, the bottom surfaces of these feet would contact the strip interior surface I. The strip 10 is shown as being folded centrally and symmetrically down its length axis, so that the abutted flanges 18 are centrally located, and that is generally the desired shape. However, the abutted flanges 18 could be located off center, for some specialized application. The method of the invention, while not changing these basic final steps in the process, takes advantage of them in a unique fashion described next.

Figure 10:
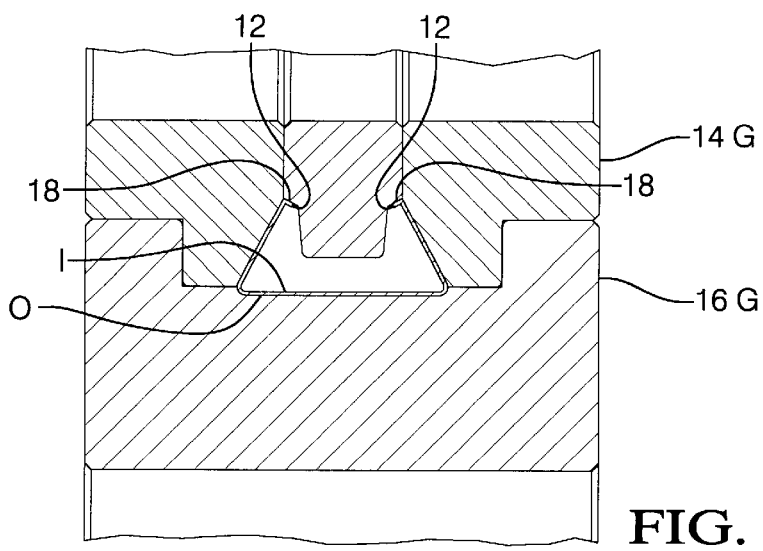
FIG. 10 is a cross section through the next set of rollers in the progressive forming line.
Figure 11:
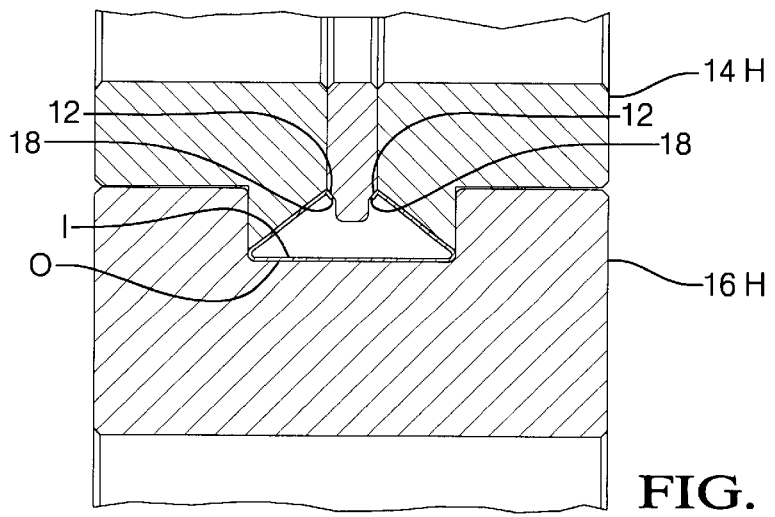
FIG. 11 is a cross section through the next set of rollers in the progressive forming line.
Figure 12:
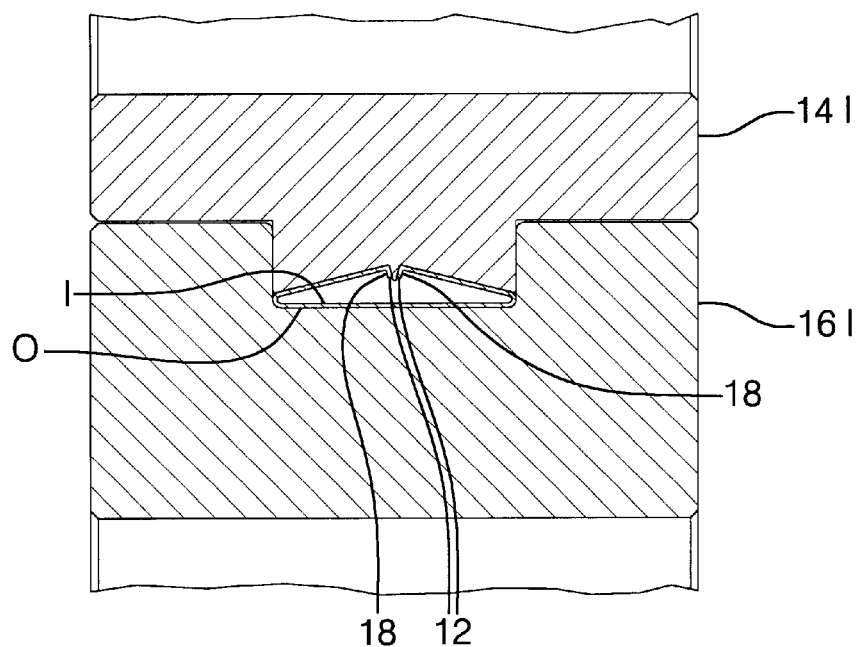
FIG. 12 is a cross section through the next set of rollers in the progressive forming line.
Figure 13:
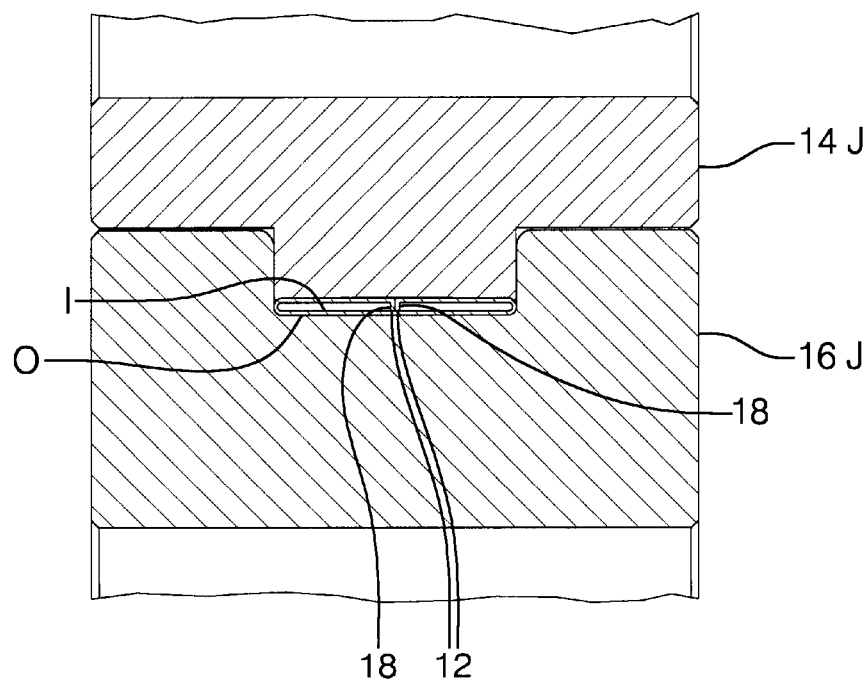
FIG. 13 is a cross section through the last set of rollers in the progressive forming line.
Figure 14:
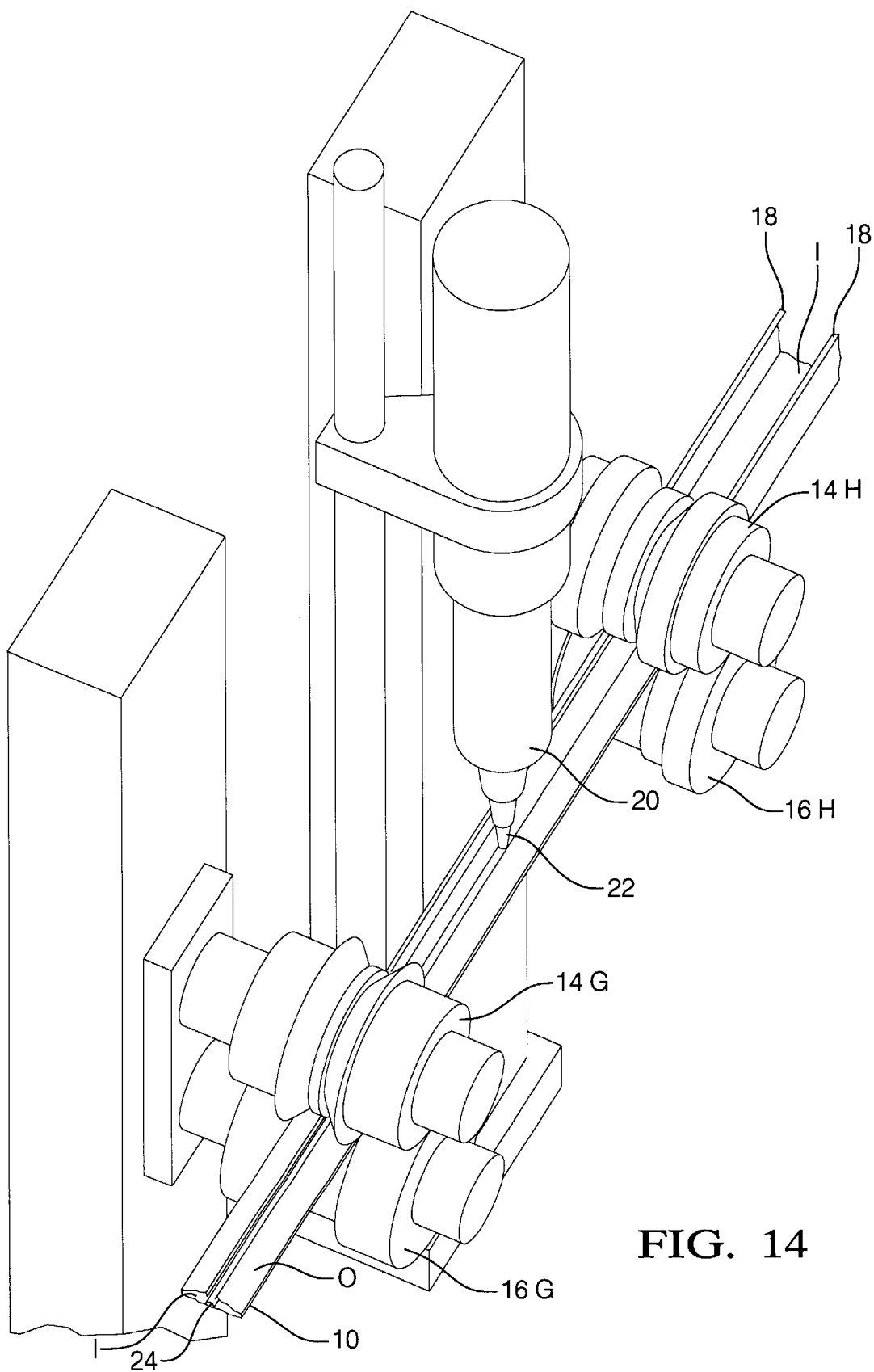
FIG. 14 is a perspective view of a dispense nozzle located between two roller stations in the progressive forming line.

Referring next to FIG. 14, a powered dispense valve 20 with a nozzle 22 is placed at a point in the roller line between the roller stations G and H, corresponding to FIGS. 10 and 11. The dispense valve 20 is relatively compact, and there is sufficient room to insert it into the line without interfering with the normal roller station placement or operation. Valve 20 is one of the commercially available kinds of dispense valves generally used to dispense adhesive or like materials from a nozzle 22. These are typically powered by pressurized air, and can be closely controlled so as to dispense a bead of material of any desired formulation and viscosity, at any desired rate. As such, the valve 20 can operate actively and independently of the workpiece or surface on which it is dispensing a bead. That is, while its dispensing rate can be matched and tailored to the rate at which a workpiece surface is being fed past or underneath the nozzle 22, the valve 20 is not limited by or dependent upon the motion of the workpiece surface, as would a deposition wheel or roller that was passively being rolled along by and with the surface. A roller would have to engage the interior surface of strip 10, at the right contact pressure, and dispense a layer of material that was in a limited viscosity and fluidity range, and of a limited thickness. By contrast, the operation of valve nozzle 22 here has no such limitations.

Referring next to FIG. 15, valve 20 is located such that a bead 24 of the desired material, described in detail below, is laid down on the center of the strip interior surface I. Bead 24 is generally semi-cylindrical in shape, approximately 1.5 mm wide at the base and 1.5 mm thick or high it the center, a shape and size pre determined to present a thick enough bead 24 to achieve an end result detailed below. Strip 10 may run at a speed ranging from 25–75 meters per minute, but commercially available dispense valves like 20 are capable of laying down a bead 24 at a rate that will match that speed. Specifically, the material in bead 24, which can be generally referred to as; braze material, may consist entirely of a flux slurry mixture composed of, in approximate ranges by weight percentage, 25–35% potassium fluoroaluminate (basic flux component), 0–1% methylcellulose compound, 60–70% propylene glycol, and 1–2% isopropanol. The methylcellulose compound is preferably one such as "Methocel OS," a Dow Chemical trade name for a commercially available compound that serves as a suspension agent and provides viscosity control. Adding more of the suspension agent would make the bead 24 more viscous, but, as noted, the dispense valve 20 can handle relatively high viscosity materials. The propylene glycol acts as a carrier for the slurry mixture. The small percentage of isoproponal serves as a wetting agent to reduce the surface tension repelling action of any lubricating oil sheen that may reside on the surface of the strip 10. Alternate materials and compounds may also serve as carriers, suspension agents, and wetting agents in the flux slurry, and other basic flux compounds could be used, as well. In addition, it may be desired to add a braze paste or alloy to the material dispensed as bead 24. For example, a flux/braze alloy mixture could comprise, in approximate weight range percentages, 25–50% flux (same basic compound as the above flux slurry, or an equivalent), 0–1% methylcellulose compound, 30–65% propylene glycol, 0.5–2% isopropanol, and 10–20% of a suitable braze alloy, which would generally be the same or similar alloy to whatever was used on the other brazed surfaces of the rest of heat exchanger in question. The addition of braze alloy to the mix allows for control of the tendency of the seam between the abutted flanges 18 to draw or pull melted braze material away from other areas in the heat exchanger core, such as the header slots where the ends of the tubes are inserted. By increasing the concentration of braze alloy in the seam, that tendency to scavenge melted cladding layer can be stopped, or even reversed, another advantage of the ability of the dispense valve 20 to handle and lay down a bead of material of essentially any composition, consistency or viscosity desired. Specifically, here, nozzle 22 is an 18 gage size, about 0.84 mm in inside diameter, and dispenses under a pressure of approximately 3.0 to 4.2 bar, with a strip speed ranging from 25–75 meters per minute. There is no necessity to increase the clad braze layer thickness on the surface of strip 10. Valves like 20 generally operate with high pressure air, and even a material with a viscosity that ranges over approximately 3450–1667 centistokes (over a 70 to 100 degree F. temperature range), like the material noted above, can be dispensed, in sufficient thickness and width. Application of the material through the use of an intermediate applicator, such as a roller, would require a fluidity of the material that could be at odds with its optimal operation.

Referring next to FIGS. 15 through 21, the operation of the stations further downstream in the progressive roller line is illustrated, after the bead 24 has been applied. The progressive rolling action is not disrupted, and is, in fact, used to good effect in the final stages. The action of bead 24 is shown in enlarged detail in FIGS. 19 through 21. As the top folds of strip 10 bend down toward their final, flattened position, immediately after bead 24 has been applied, the edges 12 of flanges 18 are plunged into the thick center of bead 24, as the faces of the flanges 18 converge toward one another in a narrowing V shape. Finally, the faces of the flanges 18 abut, or substantially so, as the edges 12 reach the bottom of bead 24 and contact the center of the strip inner surface I. At this point, the shape of a fabricated tube 26 is completed, although the brazing operation has not yet been carried out. As best seen in the enlarged views, as the faces of the flanges 18 converge, a layer of the material of bead 24 is squeezed or forced up into the seam formed between them. This is a pumping or squeezing action that would occur even if the lower flange edges 12 were sharp, but which is assisted by the slight chamfer as disclosed. Bead 24 is sufficiently thick that this squeezing action can occur. If sufficiently thick, this squeezed layer of flux and or flux and braze alloy can reach all the way to the top of the interface or seam between the abutted flanges 18, even acting to fill in the gap or trench at the top of the seam along tube outer surface O. At the same time, an ample supply of the original bead material remains between and to either side of the flange edges 12. If the flanges 18 were made with the L shape as disclosed in U.S. Pat. No. 2,655,181, then the foot of the L would seat itself in the remaining bead material as the flanges 18 moved downwardly to their final folded position, squeezing it out along tube inner surface I, but still squeezing material up and into the seam. While the converging motion of the faces of the flanges 18 occurs just from the folding down action, a thinner layer of less viscous flux, such as that which could be practically applied by a roller, would not be sufficiently thick to enable bead material to be squeezed and forced up between the flanges.

Once the final tube shape has been formed, the next step is to cut the tube 26 to desired lengths and stack the tube lengths into a standard core, such as a radiator or heater, for example. Once stacked in a core and clamped or bound, the ends of the tube 26 would be inserted into a header slot, or the equivalent, and adjacent pairs of parallel tubes 26 would have standard corrugated air fins or air centers compressed between their outer surfaces O. This stacking and clamping into a core is sufficient to maintain the flat cross section of tube 26, and to keep the flanges 18 abutted and the flange edges 12 firmly embedded down into the material of the bead 24 and in contact with tube inner surface I. In the braze oven, the stacked and bound core is heated, the clad layer the tube outer surface O melts, and melted braze material flows by capillary action into the various component interfaces with surface O, such as tube end to header slot, tube surface to air fin crest, and the seam between the abutted flanges 18. The presence of braze paste or alloy into the bead 24 would provide a stronger bond between the flanges 18, and also be more tolerant of a lack of complete abutment of the outer surfaces (O) of the flanges 18, as compared to reliance on the clad layer on strip 10 alone. The addition of braze alloy to bead 24 also provides a very simple and effective means of dealing with the braze material scavenging problem discussed in U.S. Pat. No. 6,000,461. No extra cladding layer on the headers or air fins would be needed, and the extra concentration of braze alloy in the seam formed between the abutted flanges 18 would stop, or even potentially reverse the robbing of braze material that could otherwise threaten the integrity of the braze joints formed at the various interfaces. This is achieved with no significant change in the basic tube geometry, and without interfering with the basic progressive rolling process that creates the tube shape. In some cases, sufficient braze material on the tube outer surface O may exist, or braze clad air fins may be readily available, and the flux slurry alone would be sufficient in bead 24. For some applications, adding braze alloy to the bead 24 may be sufficient, with no clad layer on either surface of strip 10, although it is most likely that a clad layer on outer surface O would be desired.

What is claimed is:

1. A method of forming a heat exchanger tube (26), comprising the steps of;

progressively forming a strip (10) of metal stock having an outer surface (O) and inner surface (I) at a series of stations (A–J) so as to initially form a pair of substantially flat, substantially perpendicular integral flanges (18) with edges (12) on opposite sides of said strip (10), continually dispensing a bead (24) of flux material directly along the center of the strip inner surface (I), said bead (24) having a predetermined thicknesses, progressively forming said flanges (18) downwardly and toward each other as the edges outer surfaces (O) of said flanges (18) move into a substantially abutting interface and the lower edges (12) of said flanges(18) move down into said bead (24) and into contact with the strip interior surface (I), said bead (24) thickness being sufficient to allow material therefrom to be forced up and into the interface between said flanges (18) as the flanges (18) move into abutment and brazing said strip (10) so as to complete said heat exchanger tube (26).

2. The method of claim 1, further characterized in that the outer surface (O) of strip (10) is clad with a layer of braze material.

3. The method of claim 1 or 2, further characterized in that the lower edges (12) are initially chamfered.

4. The method of claim 1, further characterized in that a braze alloy is added to the flux material of bead (24).

* * * * *